April 22, 1958 T. W. MELE 2,831,421
BARBECUE MECHANISM
Filed Feb. 21, 1956 2 Sheets-Sheet 1
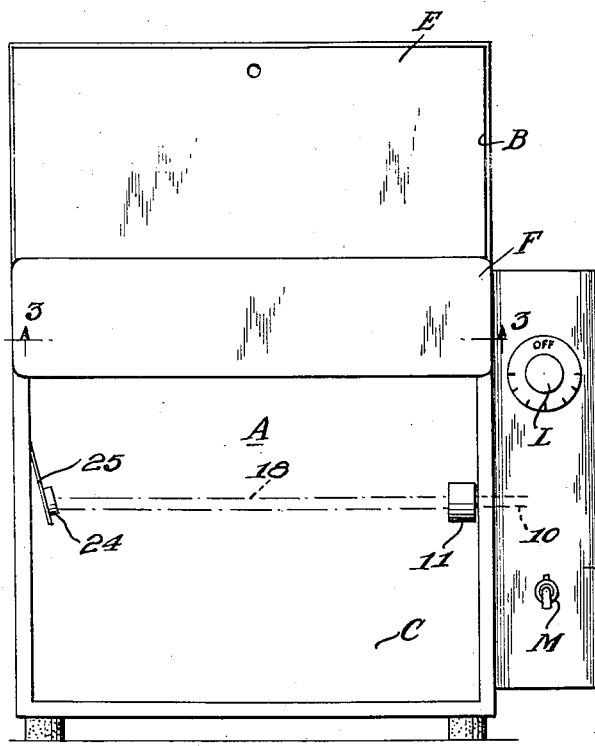
Fig. 1.
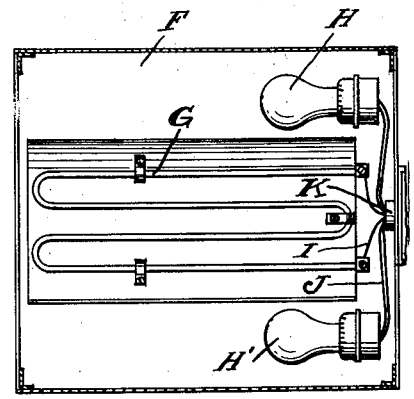
Fig. 3.
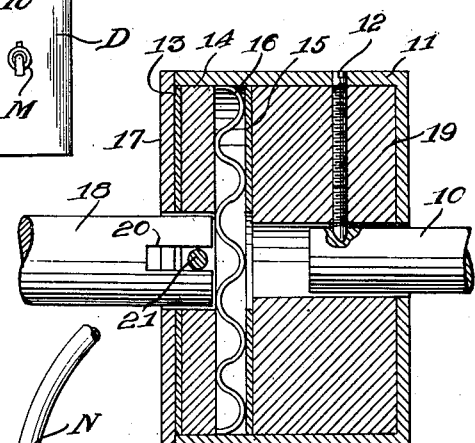
Fig. 4.
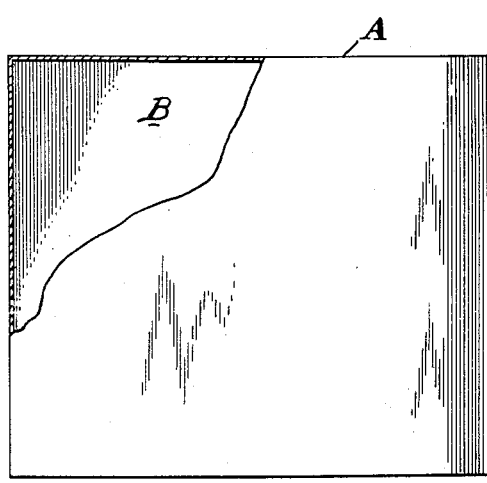
Fig. 2.
Fig. 4A.
INVENTOR
Thomas W. Mele
BY
Herbert M. Birch
ATTORNEY April 22, 1958 T. W. MELE 2,831,421
BARBECUE MECHANISM
Filed Feb. 21, 1956 2 Sheets-Sheet 2
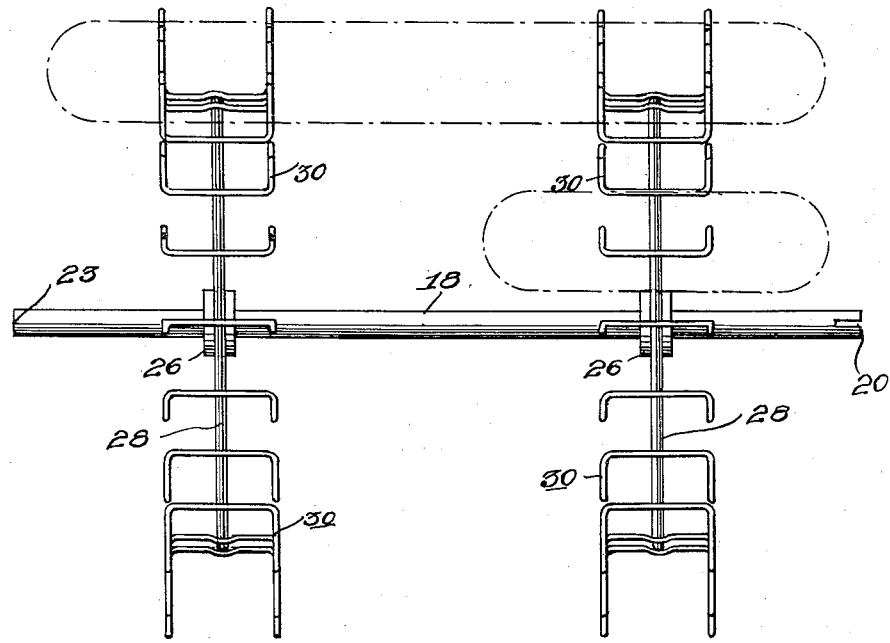
Fig. 5.
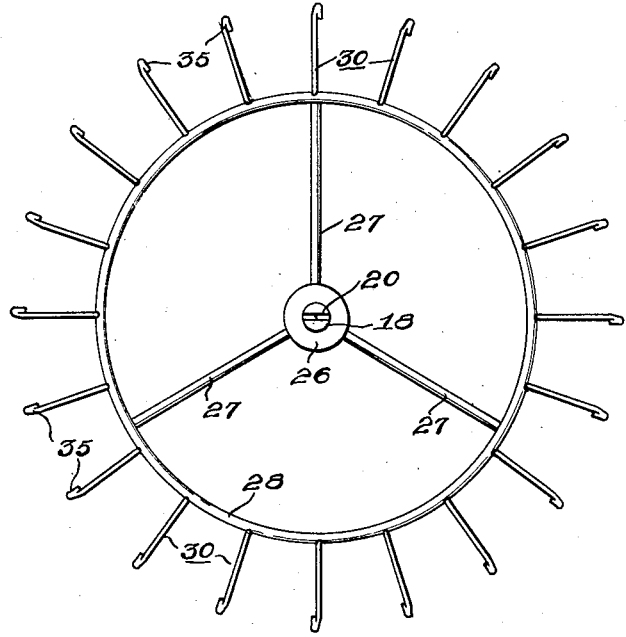
Fig. 6.
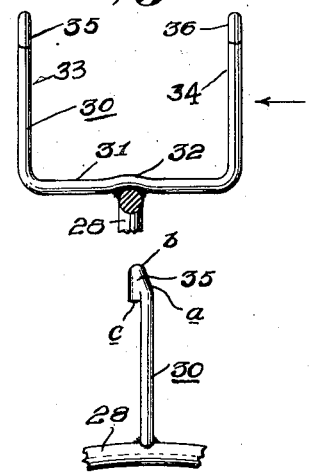
Fig. 7.
Fig. 8.
INVENTOR
Thomas W. Mele.
BY Herbert M. Birch
ATTORNEY

United States Patent Office 2,831,421
Patented Apr. 22, 1958

2,831,421

BARBECUE MECHANISM

Thomas W. Mele, Baltimore, Md.

Application February 21, 1956, Serial No. 566,914

7 Claims. (Cl. 99—421)

The present invention relates to a barbecue mechanism of the rotary spit type and more particularly to a novel multiple spit wheel arrangement and drive therefor.

Heretofore, most prior forms of rotary barbecue spits comprise a shaft from which are readily extending pointed rods. The food in most instances to be barbecued is skewered onto the rods longitudinally so the rod extends throughout the length of the food product with the result that the product is formed with an undesirable opening throughout the length of the product permitting loss of the juices and much of the flavoring of the product and overcooking and scorching of the inner part of the product affecting its flavor. This is particularly so, if the same is not removed soon enough from the spit, because the metal spit elements therein become too hot during continued use, such as in restaurants and hotels.

An object of the present invention is to provide a novel rotatable spit having a plurality of spaced apart short tines for firmly impaling food products by transversely piercing the body of the same.

Another object is to provide a spit unit formed of a plurality of spaced U-shaped impaling elements secured to spaced apart wheel members adapted to efficiently retain food bodies of varying lengths and diameters thereon during rotation thereof in a cooking compartment or oven.

Still another object is to provide a plurality of spaced hoop members on a rotatable power driven shaft having a plurality of U-shaped elements with barbed free ends secured around the circumference of the hoop members.

Still another object is to provide a novel slip drive connection from a drive shaft to the driven shaft of the spit wheel, whereby the spit wheel units may be held fixed temporarily without disconnecting the shaft or stopping the drive motor for impaling fresh products to be barbecued.

The above and other objects and advantages of the present invention will appear more fully hereinafter from a consideration of the detailed description which follows, taken with the accompanying drawings wherein one embodiment of the invention is illustrated. It is to be expressly understood, however, that the drawings are for the purpose of illustration only and are not intended as a definition of the limits of the invention.

In the drawings, wherein like reference characters refer to like parts throughout the several views:

Figure 1 is a front elevation view of a cabinet such as may be used for mounting the present novel rotatable spit members and disclosing the driven spit shaft end bearing spring mount and the novel slip clutch connection from the driving shaft.

Figure 2 is a top plan view partly in section of the cabinet;

Figure 3 is a section view taken in the direction of the arrow on section line 3—3 of Figure 1;

Figure 4 is a detailed section view slightly pulled apart, illustrating the slip clutch and shaft connections;

Figure 4a is a detail of the drive connection to the driven shaft of the clutch means;

Figure 5 is a front elevation view of the assembled spit wheel units on the driven shaft;

Figure 6 is a side elevation view of one of the novel spit wheels showing the split driven end of the spit shaft;

Figure 7 is a fragmentary front view of one of the U-shaped impaling members, illustrating their novel shape and connection to the outer circumference of the hoop member of the spit wheel; and Figure 8 is a fragmentary side view of one of the impaling members shown in Figure 7.

Referring to the drawings and first with reference to Figures 1, 2 and 3, there is shown a cabinet A having a warming compartment B at the top, a barbecue or cooking compartment C open on the front side, and a motor and control housing D attached to a side of the cabinet A.

The warming compartment B may have a door E and a bottom panel F, which also serves as the top of the barbecue compartment C. This panel F mounts the usual heating element G and a pair of spaced lamps H and H'. The heating element and lamps connect by electrical conductors I and J through an insulated bushing K to a heater control dial L and a toggle switch M for a drive motor connected to a source of electric energy supplied through an electric plug on cable connector N.

The motor, not shown, drives a shaft 10 and a friction clutch housing 11, see Figures 1 and 4. The clutch housing 11 is driven by a pin 12 connecting the drive shaft 10 thereto. This housing is stacked with adjacent friction disks 13, 14 and 15 with a spring loaded washer 16 interposed between disks 14 and 15, so as to force the disk 13 into frictional drive connection with the inner face of an apertured end wall 17 of the clutch housing 11. The disks of the clutch mechanism are each formed with central openings to receive the ends of the drive and driven shafts 10 and 18, respectively. For example, the drive shaft 10 projects into the center opening of disk 19 and the driven shaft or spit wheel shaft 18 extends through the central openings of disks 13, 14. This end of the spit wheel driven shaft 18 is formed with a slot 20, in which is adapted to engage a drive pin 21 mounted transverse to the opening in normally rotatable disk 14, while the opposite end 23 is blunt and squared off, to thereby seat and journal in a cradle bearing 24 mounted on the free end of a flat leaf spring 25. This leaf spring 25 is secured to the inside wall of the oven or barbecue portion C and is angled inward of the wall as shown in Figure 1. This spring mounting of the end of the spit shaft 18 permits the complete spit shaft and wheel assembly to be removed from the friction clutch drive pin 21, so that the unit may be washed thoroughly after use or interchanged with a clean unit.

Each novel spit wheel comprises a hub 26 with radiating spokes 27, which are secured to the inner circumference of a hoop or ring 28, see Figures 6, 7 and 8. This arrangement forms in effect a wheel to which are secured by suitable means, such as solder or the like, a plurality of impaling elements, such as the U-shaped impaling forks 30. The bottom bar 31 of each U-shaped fork 30 is curved upward at 32 in the direction of the fork tines 33 and 34, which form the spaced legs of the U-shaped elements. The bottom bar 31 is secured at substantially right angles to the ring 28 and brazed or soldered thereto at the curved portion 32, see Figure 7.

Each tine 33 and 34 of the U-shaped fork 30 is formed with barbed ends 35 and 36. These barbs are of the hook type and comprise an angled surface *a* to a penetrating tip *b* and are then bent reversely downward against the respective tines or legs to provide a food holding shoulder or barb *c*.

The operation of the barbecue apparatus is believed to be generally clear from the foregoing description thereof. For example, the novel spit shaft assembly with the impaling wheels is inserted in the heating chamber C by first engaging the blunt end of the shaft 18 in the cradle bearing 24 on the free end of the leaf spring mounting 25, so as to push the bearing toward the side of the chamber C, and thereby permit the slotted shaft end 20 to be inserted into the friction clutch housing or shell 11 over the transverse drive pin 21 carried by friction drive disk 14. Then the toggle switch M may be closed to start the motor and the heater is turned on and set to the degree desired by the dial L.

Assuming frankfurters of different sizes, such as illustrated in Figure 5 are being cooked, these may be impaled before the barbecue wheels are started to rotate, and mounted on the barbed tines, so that the extra long frankfurters are extended across both barbecue wheels, while the shorter frankfurters are impaled only by the barbed tines of each respective single one of the wheels.

Continuous operation of the motor is facilitated by the slip clutch arrangement, that is, the frankfurters may be placed on the wheels and removed therefrom without overloading the motor during such interchange of the food products. Also the spaced apart barbed ends of each set of tines for each U-shaped impaling member very solidly retain the food products thereon while they are being cooked and eliminate any possibility of them slipping off the spit elements by gravity as the spit elements rotate.

Without further description it is believed that the present invention is clearly understandable to others authorized to practice the same. While only one embodiment of the invention is described and illustrated in detail, it is to be expressly understood that other combinations, modifications and arrangements of the parts which will now probably occur to others skilled in the art are to be considered a part hereof. To determine the scope of the present invention, reference should be had to the appended claims.

What is claimed is:

1. A barbecue spit comprising an elongated shaft, a wheel secured to the shaft comprising a rim of circular form, and a plurality of impaling forks disposed around said rim in circumferentially spaced relation, each of said impaling forks being of U-form and including a base bar disposed transversely of said rim and being secured intermediate its ends to said rim, and a tine extending outwardly in off-set relation to each side of the said rim from each end of said base bar and in parellel relation to the plane of said rim, and the outer end of each of said tines being bent at two spaced points providing a short section inclined to the axis of the main tine portion and a terminal section in parallel relation to said main tine portion, whose free end provides a food retaining shoulder or barb.

2. A barbecue spit comprising an elongated shaft, at least two wheels supported by the shaft in spaced relation axially thereof, each of said wheels including a rim of circular cross section, and a plurality of U-shaped food impaling members secured to the rim of each wheel in uniformly spaced relation circumferentially thereof, said U-shaped food impaling members each comprising a single length of wire-like material and including a bottom bar and a pair of spaced parallel tines extending outwardly from opposite ends of the bottom bar in off-set relation to the rim, the bottom bars being curved outwardly intermediate their ends in the provision of seats for the rims, and said bottom bars being rigidly connected transversely to said rims adjacent said curved portions of the bars.

3. The structure according to claim 2, wherein the pairs of tines supported by one wheel are aligned with like pairs of tines supported by another wheel in directions axially of said shaft, whereby relatively short frankfurters may be impaled on the tines of one wheel and relatively long frankfurters may be impaled on axially aligned pairs of tines on two adjacent wheels.

4. Means for barbecuing food products comprising a cabinet, a heating element supported in said cabinet, a housing at one end of said cabinet, a motor in said housing, a driven shaft removably supported in said cabinet beneath said heating element, a wheel supported by said shaft adjacent each end thereof, a series of circumferentially spaced food impaling tines supported by each wheel at each side thereof with the tines of one wheel aligned with those of the other wheel longitudinally of said shaft, said motor having a drive shaft disposed co-axially of said driven shaft, and a friction drive connection between said drive shaft and said driven shaft, whereby said tines may be loaded and unloaded during constant operation of said motor.

5. The structure according to claim 4, wherein said friction drive connection comprises a cylindrical clutch housing connected to one end of said drive shaft, and having an end wall through which an end of said drive shaft freely extends, a disk freely disposed in said housing adjacent said end wall, a spring loaded washer in said housing for urging said disk into driving engagement with said end wall, and a drive connection between said driven shaft and said disk providing relative movement between said disk and said driven shaft axially thereof.

6. The structure according to claim 5, wherein said drive connection comprises a diametrical slot in the adjacent end of said driven shaft and a pin extending diametrically of said disk and freely extending through said slot.

7. The structure according to claim 6, together with a flat leaf spring whose one end is secured to a wall of said cabinet and whose opposite free end is disposed inwardly of said wall, and the free end of said spring being provided with a cradle bearing for removable reception of the other end of said driven shaft.

References Cited in the file of this patent

UNITED STATES PATENTS

| | | |
|---|---|---|
| 1,111,870 | Spurgeon | Sept. 29, 1914 |
| 2,090,793 | Hallum | Aug. 24, 1937 |
| 2,484,858 | Schmidt | Oct. 18, 1944 |
| 2,552,621 | Clay | May 15, 1951 |
| 2,561,538 | Schultz | July 24, 1951 |
| 2,577,184 | Dietrich et al. | Dec. 4, 1951 |
| 2,710,575 | Overman | June 14, 1955 |